Dec. 12, 1939.  W. F. WRIGHT  2,183,385
MANUFACTURE OF CUTTING FILES
Filed Jan. 10, 1939   2 Sheets-Sheet 1
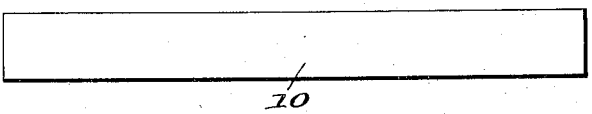
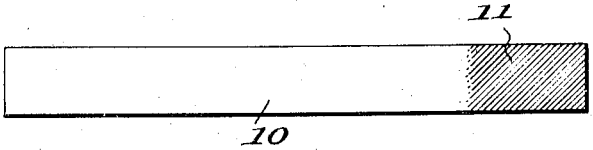
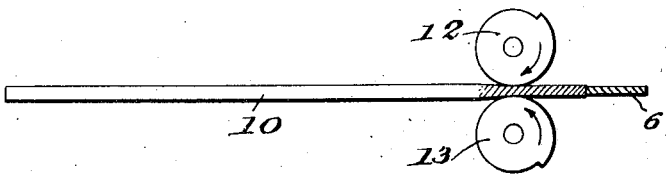
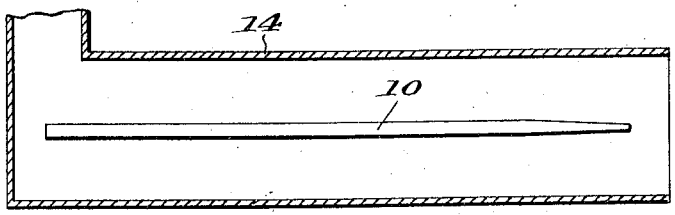
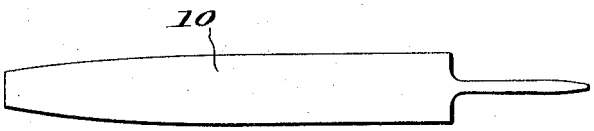
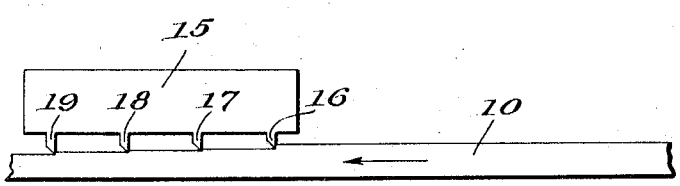
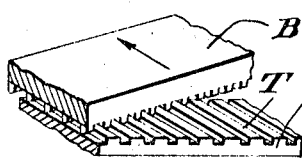
Inventor:
William F. Wright
By Dike, Calver + Gray
Attorneys Dec. 12, 1939.          W. F. WRIGHT          2,183,385
MANUFACTURE OF CUTTING FILES
Filed Jan. 10, 1939          2 Sheets-Sheet 2
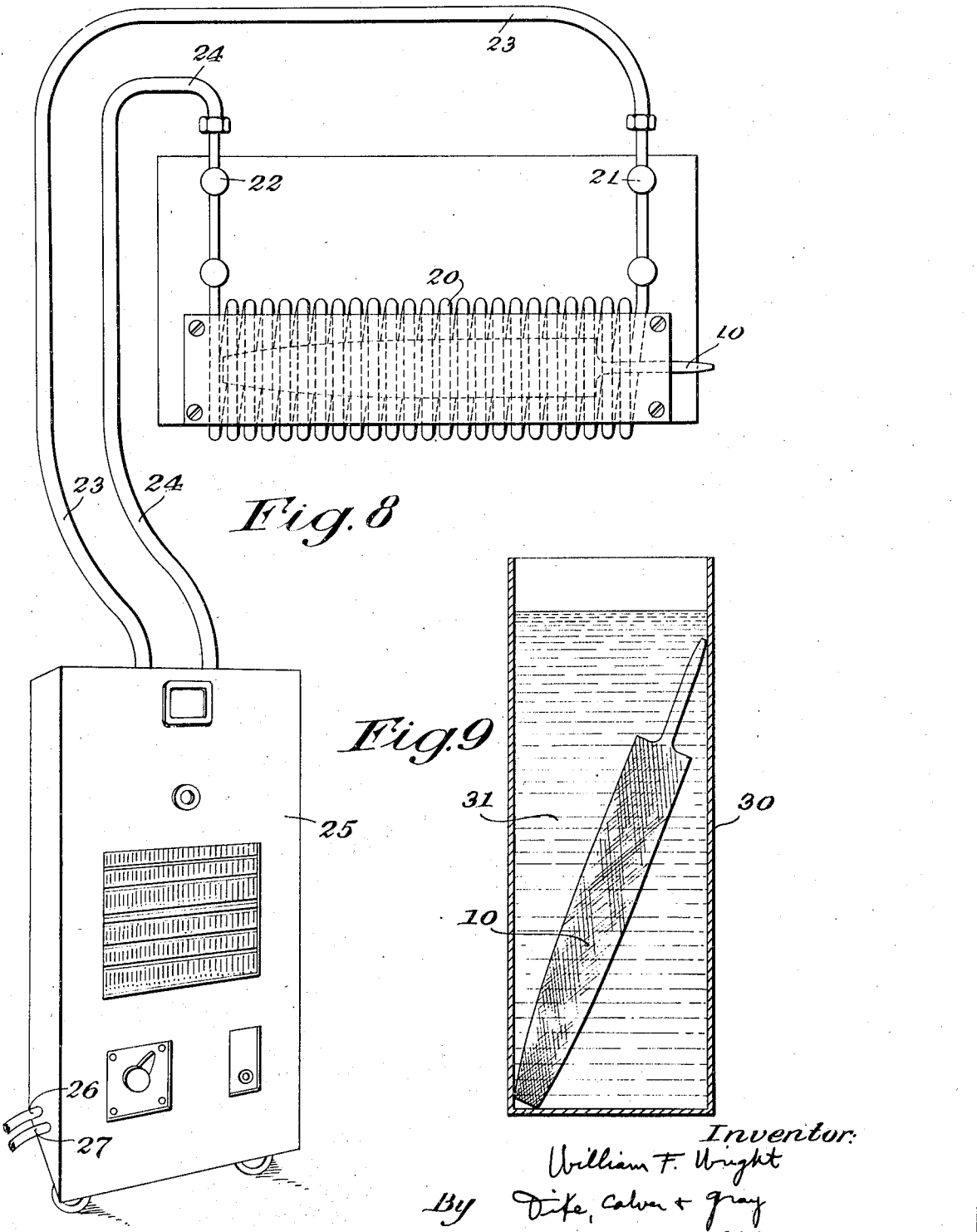

Patented Dec. 12, 1939

2,183,385

UNITED STATES PATENT OFFICE 2,183,385

MANUFACTURE OF CUTTING FILES

William F. Wright, Lisbon, Ohio

Application January 10, 1939, Serial No. 250,128

2 Claims. (Cl. 76—24)

In accordance with customary practice in the manufacture of cutting files from steel, the blank is annealed and then shaped by a punching operation. The annealing operation is essential to get the steel structure in proper condition for the punching operation but results in decarburizing the surface of the blank. The decarburized surface then is removed by grinding and the file teeth are cut. If the file teeth were cut without removing the decarburized surface, it would not be possible to heat treat the teeth to obtain the desired hardness.

After cutting the file teeth, the file is heat treated to harden the teeth. In order to prevent decarburization during heat treatment, the teeth are covered with a protective layer applied in the form of a paste which usually contains such materials as charcoal, bone dust or flour and the like. The file then is heated to the desired temperature by immersion in a pot of molten lead. When heated to the desired temperature, the file is removed and quenched in water, brine or the like. The protective layer over the teeth then is removed.

The removal of the decarburized surface of a file blank by grinding leaves objectionable markings upon the blank. If the periphery of the grinding wheel is used, the finished surface of the blank will contain waves identical with the pitch of the feed of the grinding wheel across the blank. If the flat side of the grinding wheel is used, the feed marks are arcs of a circle. It is difficult to control the amount of metal removed by grinding because of wear of the grinding wheel. If too much metal is removed from one side of the blank by grinding, as is often the case, the file blanks either will not be uniform in thickness or the decarburized surface will not be completely removed from the other side of the blank.

The hardening of files by heating in a lead pot has many disadvantages. The steel in a file is a high carbon steel and, consequently, the temperature to which it must be heated for hardening is very critical. A variation of 20 to 25 degrees F. causes considerable variation in the quality and characteristics of the file. It is difficult to control the temperature of the lead pot as it will vary with the speed at which the hot files are removed and cold files introduced. The placing of files in the lead pot and their removal is a manual operation and, consequently, the characteristics of the files vary with the human element involved. The protective coating on the teeth tends to slow down the rate of cooling during quenching and lower the hardness of the file.

The above difficulties are overcome by the provisions of the present invention. In accordance with the invention, the decarburized surface of the file blank is removed by broaching. The broaching tool is a flat tool having a plurality of cutting edges positioned at different heights so that as the file blank and broaching tool are moved relatively, the cutting edges of the tool are brought in engagement with the file blank progressively from the shortest to the longest cutting edge. The latter removes the last portion of the decarburized surface and leaves the blank free from objectionable markings. The broaching operation lends itself to automatic hopper feed and automatic removal of the finished blanks. At the same time uniformity of thickness and finish is assured while obtaining complete removal of the decarburized surfaces of the file blanks.

In accordance with another feature of the invention, after cutting the file teeth, the blank is heated to the desired temperature for hardening by electrical induction. One or more file blanks, without a protective coating, are placed within a coil which receives a current having a frequency of from 20,000 to 500,000 cycles per second. The heating of the file blank is due principally to hysteresis. The file blanks may be fed automatically from a hopper to the heating coil and discharged therefrom automatically, as by gravity, into a quenching tank. Only a very few seconds is required for heating the blanks to the desired temperature. Most of this time is consumed in bringing the blank to a red heat below which decarburization does not take place. The remainder of the time is so short that no practical or noticeable decarburization takes place. When heated by electrical induction, the temperature to which the blanks are heated will not vary more than two or three degrees.

The invention will be more clearly understood from the following description in conjunction with the accompanying drawings: in which, Fig. 1 is a plan view of a file blank;

Fig. 2 is a plan view of the blank showing one end softened by heating;

Fig. 3 is an elevational view of an apparatus for tapering one end of the blank;

Fig. 4 is a sectional view of an oven for annealing the blank;

Fig. 5 is a plan view of the blank after it has been annealed as shown in Fig. 4 and punched to the shape shown in Fig. 5;

Fig. 6 is an elevational view illustrating the removal of the surface of the blank by a broaching operation;

Fig. 7 is a plan view of the finished file before hardening;

Fig. 7a is a fragmentary perspective view of a machine for cutting the file teeth;

Fig. 8 is a diagrammatic view of an apparatus for heating the blank by electrical induction; and Fig. 9 is a sectional elevational view of a quenching tank.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the manufacture of files in accordance with the invention, a file blank 10 as shown in Fig. 1 is cut from a strip of suitable high carbon steel. One end portion 11 of the blank is heated as shown by the shade lines in Fig. 2. The heated end portion 11 of the blank is positioned, as shown in Fig. 3, between the "back rolls" 12 and 13 when the gap between the rolls is widest and with the end of the blank engaging the stop 6. The rolls 12 and 13, which are positively rotated in the direction of the arrows, carry eccentricdies 3 and 4 respectively which engage the blank and taper the end portion as shown in Fig. 4 and in so doing move the blank from between the rolls. The blank 10 then is placed in an oven 14, as shown in Fig. 4, and annealed to put the structure of the steel in proper condition so that the blank may be punched in the usual manner to the shape shown in Fig. 5.

The annealing operation decarburizes the surface of the blank, that is, some or all of the carbon in the surface layer of the blank is burned out or lost by combining with the elements, principally oxygen, surrounding the blank during the annealing operation. Because of this reduction in the carbon content of the surface layer of the blank it could not be hardened and, consequently, this surface layer must be removed before the file teeth are cut on the blank. In accordance with the invention the decarburized surface of the blank is removed by passing the blank 10 through a broaching machine having a broaching tool 15, as shown in Fig. 6, provided with a plurality of cutting edges 16, 17, 18 and 19 extending progressively greater distances from the body of the tool. Thus, as the blank 10 is passed through the broaching machine a thin surface layer of metal is removed from the blank 10 by cutting edge 16 and thereafter additional thin layers of metal are removed progressively by the cutting edges 17, 18 and 19. Cutting edge 19 removes the final portion of the decarburized surface of the blank and leaves the surface of the blank unmarked. It will be understood that the other decarburized surfaces of the blank are removed in a similar manner. The same amount of metal is removed from each blank successively so that all the blanks are of the same dimensions.

The teeth T may then be cut upon the blank as shown in Fig. 7 in the usual manner. In accordance with the invention, however, the teeth are cut in a broaching machine having a tool with serrated teeth as illustrated in Fig. 7a. The tool B and file blank 10 are moved relatively so as to cut the teeth at the desired inlination. If desired, the tool of the broaching machine illustrated in Fig. 6 may be provided with serrated teeth in addition to those illustrated so that the decarburized surface of the blank may be removed and the file teeth cut in a single operation.

The file in the condition as shown in Fig. 7 is then heat treated to harden the teeth. In accordance with the invention an apparatus of the general character illustrated in Fig. 8 is employed for heating the file to the proper hardening temperature which usually is about 1475° F. The apparatus as illustrated in Fig. 8 comprises a coil 20 formed from hollow copper tubing through which cooling water is pumped. The terminals 21 and 22 of the coil 20 are connected by conductors 23 and 24 to a high frequency converter 25 which is supplied with the usual 60 cycle current at about 110 or 220 volts through conductors 26 and 27. The converter 25 converts the energy supplied through the conductors 26 and 27 to a high frequency oscillating current having frequencies of from between 20,000 to as much as 500,000 cycles per second. This high frequency current is supplied through the conductors 23 and 24 to the coil 20.

The blank 10 in the condition shown in Fig. 7 is inserted within the coil 20 and heated to the proper hardening temperature in a very few seconds. The heat is brought about principally by hysteresis caused by the repeated reversal of the magnetic field within the coil 20. When the blank 10 is heated to the proper temperature, which may be controlled by the period of time which the file is allowed to remain within the coil 20, it is removed from the coil and immersed in the quenching tank 30, shown in Fig. 9, which contains a suitable quenching liquid 31, such as water, oil, brine or the like.

I claim:

1. The method of producing a cutting file which comprises annealing the file blank, shaping the blank by punching, removing decarburized metal from the surfaces of the blank by broaching, cutting the file teeth, thereafter heating the blank by electrical induction without a protective coating over the teeth, and quenching the blank.

2. In the manufacture of a cutting file, the steps which comprise annealing the file blank, shaping the blank by punching, removing decarburized metal from the surfaces of the blank by broaching, and cutting the file teeth with a serrated broaching tool.

WILLIAM F. WRIGHT.